(12) United States Patent
Chou

(10) Patent No.: US 7,787,536 B2
(45) Date of Patent: Aug. 31, 2010

(54) ADAPTIVE EQUALIZER APPARATUS WITH DIGITAL EYE-OPENING MONITOR UNIT AND METHOD THEREOF

(75) Inventor: Min-Chung Chou, Miaoli County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 746 days.

(21) Appl. No.: 11/742,316

(22) Filed: Apr. 30, 2007

(65) Prior Publication Data

US 2008/0019435 A1    Jan. 24, 2008

(30) Foreign Application Priority Data

Jul. 18, 2006 (TW) ................ 95126155 A

(51) Int. Cl.
*H03H 7/30* (2006.01)
(52) U.S. Cl. .................................... 375/232
(58) Field of Classification Search ................ 375/232, 375/224, 333, 317; 324/76.28; 398/209
See application file for complete search history.

(56) References Cited

U.S. PATENT DOCUMENTS

| 6,784,653 B2 | 8/2004 | Baumert | |
|---|---|---|---|
| 7,574,146 B2* | 8/2009 | Chiang et al. | 398/209 |
| 2002/0060820 A1* | 5/2002 | Buchali | 359/109 |
| 2006/0164139 A1* | 7/2006 | Chong et al. | 327/158 |

OTHER PUBLICATIONS

Article titled "A 10-Gb/s Two-Dimensional Eye-Opening Monitor in 0.13-um Standard CMOS" jointly authored by Analui et al., IEEE Journal of Solid-State Circuits, vol. 40, No. 12, Dec. 2005, pp. 2689-2699.

* cited by examiner

*Primary Examiner*—Khai Tran
(74) *Attorney, Agent, or Firm*—J.C. Patents

(57) ABSTRACT

An adaptive equalizer apparatus with digital eye-opening monitor unit and the method thereof are provided. The apparatus comprises an equalizer unit, a sampling unit, and an eye-opening monitor unit. The equalizer unit equalizes a first signal to a second signal. The sampling unit over-samples the second signal and determines the logic status of the second signal according to the sampling data. The eye-opening monitor unit processes the sampling data and outputs a detecting signal according to the processing result. The detecting signal represents the adequacy of the parameters of the equalizer unit, and the equalizer unit determines whether to change its parameters according to the detecting signal.

17 Claims, 5 Drawing Sheets

ADAPTIVE EQUALIZER APPARATUS WITH DIGITAL EYE-OPENING MONITOR UNIT AND METHOD THEREOF

CROSS-REFERENCE TO RELATED APPLICATION

This application claims the priority benefit of Taiwan application serial no. 95126155, filed Jul. 18, 2006. All disclosure of the Taiwan application is incorporated herein by reference.

BACKGROUND OF THE INVENTION

1. Field of the Invention

The present invention relates to a signal receiving apparatus. More particularly, the present invention relates to an adaptive equalizer with digital eye-opening monitor unit in a signal receiving apparatus and the method thereof.

2. Description of Related Art

Digital and portable products have been continuously leading the market since the birth of digital technology, and various key technologies have been highly integrated with applications so as to provide high-speed, simple, and personalized products. Along with the increase in the speed of cable signal transmission, product designers will be confronted with more challenges in signal integrity and bandwidth adequacy of transmission media. Generally speaking, when the transmission media bandwidth is not adequate, high-speed signal will be attenuated more so that the eye diagram will not be ideal, accordingly bit error will be caused.

To transmit signal with higher speed in a particular transmission media such as RG-58 coaxial cable, conventionally the attenuated high-frequency signal is compensated so that signal with higher speed can be transmitted without producing any bit error, and this is the function performed by an equalizer. The equalizer can be disposed at the sender end or at the receiver end. However, the equalizer disposed at the sender end cannot directly detect the frequency response of the transmission media, thus the parameters thereof have to be determined by the user instead of being adjusted adaptively, except the receiver sends the detected signal back to the sender. Since the signal is transmitted to the receiver through the transmission media, the frequency response of the transmission media can be obtained by merely detecting the eye diagram of the signal so that the equalizer at the receiver end can adjust adaptively.

Regarding eye-opening monitoring, conventionally the eye diagram of a differential signal is measured. The quality of the transmitted signal and the signal timing shifting are determined by quantifying and analyzing the eye diagram.

FIG. 1 is a schematic block diagram of a conventional receiving apparatus with eye-opening monitoring function. The conventional eye-opening monitor 110 includes comparators 111, 112, and a phase interpolator 113. The eye-opening monitoring method is to detect the height of the eye diagram with the comparators 111 and 112, and detect the width of the eye diagram with the phase interpolator, so as to obtain the actual size of the eye diagram. Then, the parameters of the equalizer 120 are adjusted according to different requirement, so as to improve the quality of the received signal. Please refer to U.S. Pat. No. 6,784,653B2 and "A 10-Gb/s Two-Dimensional Eye-Opening Monitor in 0.13-μm Standard CMOS" in pages 2689-2699 of the IEEE JOURNAL OF SOLID-STATE CIRCUITS, VOL. 40, NO. 12, DECEMBER 2005 for the detailed information of related technology.

However, since comparators and phase interpolator are required for eye-opening monitoring in conventional eye-opening monitor, the area of the chip and the power consumption thereof are increased. The foregoing disadvantages become more serious along with the increase of operation frequency.

SUMMARY OF THE INVENTION

Accordingly, the present invention is directed to an adaptive equalizer apparatus for reducing bit error rate (BER) and increasing transmission quality, wherein whether to change the internal parameters of an equalizer is determined through digital eye-opening monitoring.

According to another aspect of the present invention, an eye-opening monitor unit is provided, which, compared to conventional technology, can achieve the same purpose of eye diagram monitoring with less device and lower power consumption.

According to yet another aspect of the present invention, an eye-opening monitoring method is provided to detect whether the eye diagram of an input signal is normal by obtaining a plurality of sampling data.

Based on aforementioned and other objectives, the present invention provides an adaptive equalizer apparatus for converting a received first signal into a third signal. The adaptive equalizer apparatus includes an equalizer unit, a sampling unit, and an eye-opening monitor unit. Wherein the equalizer unit receives and equalizes the first signal, and outputs the processing result as a second signal. The sampling unit is electrically connected to the equalizer unit, and the sampling unit receives and over-samples the second signal to obtain a plurality of sampling data. The eye-opening monitor unit is electrically connected to the sampling unit and the equalizer unit, and the eye-opening monitor unit processes the sampling data of the sampling unit and outputs a detecting signal according to the processing result. The detecting signal represents the present adequacy of the internal parameters of the equalizer unit, and the equalizer unit determines whether to change its internal parameters according to the detecting signal.

According to an embodiment of the present invention, the equalizer unit includes an equalizer and an algorithm unit. The equalizer receives and equalizes the first signal according to the internal parameters thereof, and outputs the processing result as the second signal. The algorithm unit is electrically connected to the eye-opening monitor unit and the equalizer for determining the foregoing internal parameters and outputting the internal parameters to the equalizer, wherein the algorithm unit further determines whether or not to adjust the output internal parameters according to the detecting signal output by the eye-opening monitor unit.

According to another aspect of the present invention, an eye-opening monitor unit suitable for an adaptive equalizer apparatus is provided. Wherein the adaptive equalizer apparatus over-samples the received first signal to obtain a plurality of sampling data. The eye-opening monitor unit includes a logic circuit which determines whether the present eye diagram is good enough so that no bit error will be produced, and outputs a detecting signal accordingly. The adaptive equalizer apparatus determines whether to change its internal parameters according to the detecting signal.

According to an embodiment of the present invention, the detecting signal remains at the first level when there are more than a particular number of over-sampled points falling within the eye diagram, otherwise the level of the detecting signal is transformed into the second level temporarily.

According to an embodiment of the present invention, the adaptive equalizer apparatus does not adjust its internal parameters thereof when the detecting signal remains at the first level; the adaptive equalizer apparatus adjusts its internal parameters when the detecting signal is transformed into the second level temporarily.

According to an embodiment of the present invention, the logic circuit includes a plurality of XOR gates and a NAND gate. Wherein each of the XOR gates respectively receives part of the sampling data. The input terminal of the NAND gate receives the outputs of the XOR gates and outputs the detecting signal.

According to another aspect of the present invention, an eye-opening monitoring method is provided, which includes over-sampling an input signal to obtain a plurality of sampling data, determining the sampling data, and detecting whether or not the eye diagram of the input signal is normal according to the determination result.

According to an exemplary embodiment of the present invention, the foregoing step of determining the sampling data includes performing XOR calculation to part of the sampling data to obtain a plurality of XOR calculation results, and performing NAND calculation to the XOR calculation results to obtain the determination result.

In the present invention, whether the eye diagram of an input signal is normal is determined by over-sampling the input signal and determining the sampling data, and whether the parameters of an equalizer are to be adjusted is determined accordingly. According to the present invention, the number of devices used is reduced considerably, so that the surface area of the chip and the power consumption thereof are reduced. Moreover, BER can be reduced and transmission quality can be improved by adjusting the internal parameters of the equalizer.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Bit error rate (BER) represents the proportion of detection errors, which is used as a reference for estimating the quality of a digital system. For example, if there is one error in every 100 determinations, BER is $1/100$, i.e. 0.01. Over-sampling technology is widely used in the receiving apparatus of signal transmission system for reducing BER and improving the tolerance thereof to signal jittering. In following embodiments, over-sampling technology will be used as the method for estimating signal quality.

Figure 1:
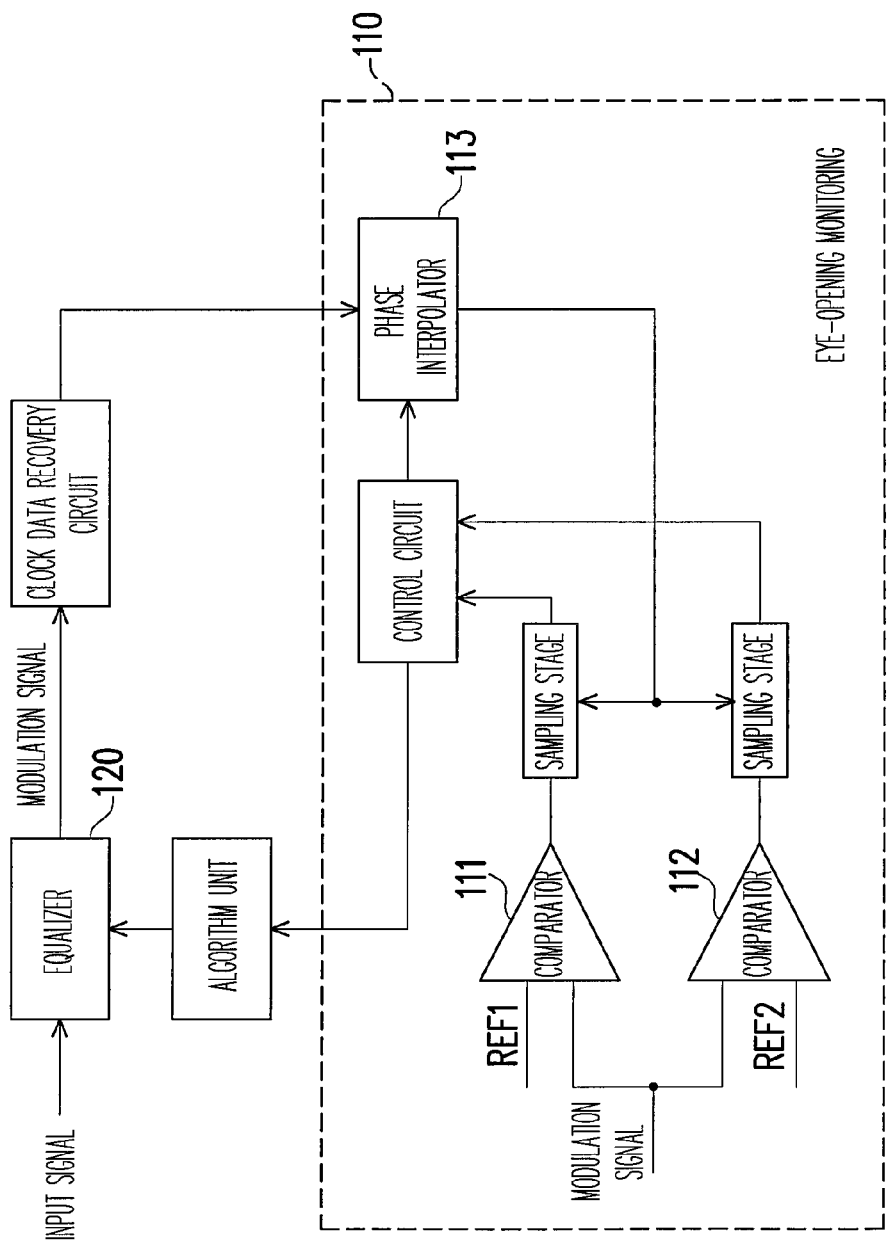
FIG. 1 is a schematic block diagram of a conventional adaptive equalizer apparatus with eye-opening monitoring function.
Figure 2:
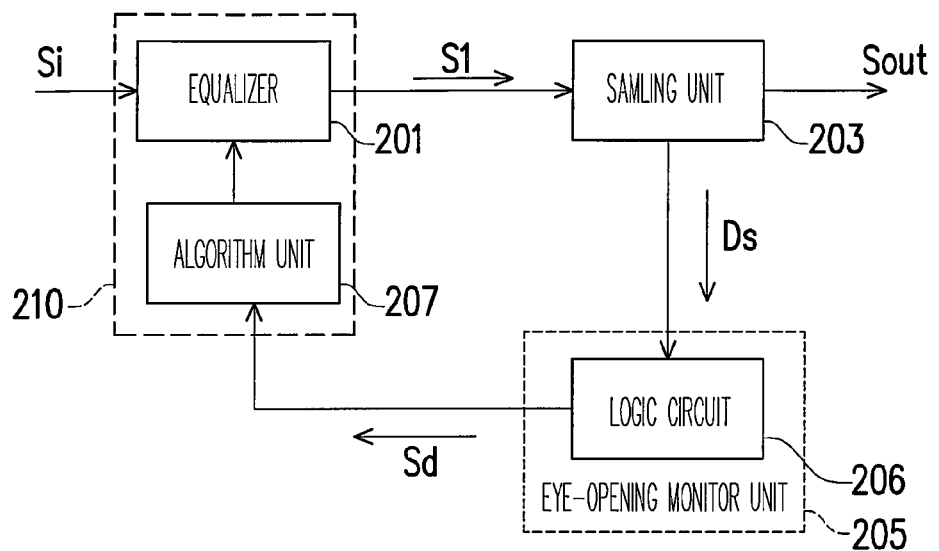
FIG. 2 is a schematic block diagram of an adaptive equalizer apparatus with eye-opening monitoring function according to an exemplary embodiment of the present invention.

FIG. 2 is a schematic block diagram of an adaptive equalizer apparatus with eye-opening monitoring function according to an exemplary embodiment of the present invention. The adaptive equalizer apparatus includes an equalizer unit 210, a sampling unit 203, and an eye-opening monitor unit 205. The eye-opening monitor unit 205 includes a logic circuit 206. The equalizer unit 210 includes an equalizer 201 and a algorithm unit 207. In the present embodiment, the sampling unit 203 can be a clock data recovery circuit.

First, the equalizer 201 receives a first signal Si (in the present embodiment the first signal Si input to the equalizer 201 is a differential signal) and equalizes the first signal Si according to its internal parameters, and then the equalizer 201 outputs a second signal S1 to the sampling unit 203. In the present embodiment, the second signal S1 is a full swing signal. The sampling unit 203 receives and over-samples the second signal S1 to obtain a plurality of sampling data Ds, wherein the sampling unit 203 further determines the logic status of the second signal S1 according to the sampling data Ds and outputs the result as the third signal Sout. In the present embodiment, the logic circuit 206 performs logic calculation by using the sampling data Ds produced by the sampling unit 203 internally. The logic circuit 206 determines whether the present eye diagram is good enough so that no bit error will be produced. This is the concept of digital eye-opening monitoring, and here just "good enough" is determined as long as no bit error will be produced. When the levels of more than a particular number of consecutive sampling data (for example, more than half of the sampling data) remain a particular value in the sampling data Ds, the detecting signal Sd output by the logic circuit 206 remains at a first level within particular period. Otherwise the detecting signal Sd falls at a second level temporarily. In the present embodiment, the first level is, for example, high level, and the second level is, for example, low level. Thus, the eye diagram is good enough only when the detecting signal Sd remains at the first level during a particular period. How long the detecting signal Sd has to remain at the first level to determine the eye diagram is good enough is different for different application, and which is only the option of design to those skilled in the art but not for limiting the scope of the present invention. In the present embodiment, the duration of the foregoing period can be determined by the algorithm unit 207. The logic circuit 206 transmits the detecting signal Sd to the algorithm unit 207. One function of the algorithm unit 207 is to determine whether the period of the detecting signal Sd remaining at the first level is long enough, if so, the eye diagram is good enough and the algorithm unit 207 keeps it as an internal parameter. If the detecting signal Sd presents low level during a particular period, then the eye diagram of the second signal S1 is not good enough, that is, the internal parameter output by the algorithm unit 207 presently is not suitable, then the algorithm unit 207 controls the equalizer 201 to adjust its internal parameters until the detecting signal Sd output by the logic circuit 206 remains at high level during a particular period.

The equalizer unit 210 and the sampling unit 203 can be implemented by any means, for example, with the conventional technology described in the present disclosure, by those having ordinary knowledge in the art. For the convenience of description, in following embodiments, the sampling unit 203 is assumed to be a clock data recovery circuit and sampling the second signal S1 with five times sampling rate.

Figure 2A:
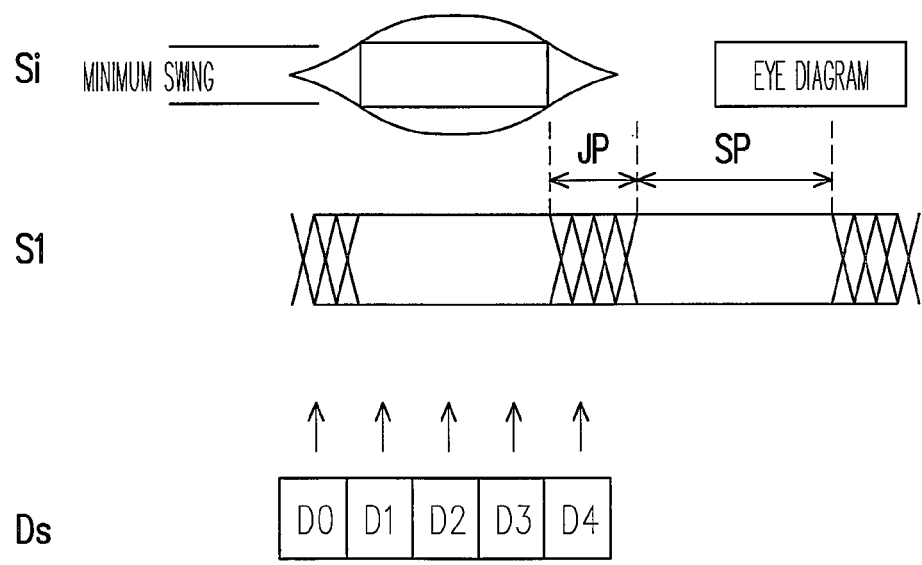
FIG. 2A is a timing diagram of the signal transmission in the adaptive equalizer apparatus in FIG. 2.

FIG. 2A is a timing diagram of the signal transmission in the adaptive equalizer apparatus in FIG. 2. First, the equalizer 201 receives a first signal Si. The equalizer 201 equalizes the first signal Si according to its internal parameters and outputs the second signal S1 to the sampling unit 203. In the present embodiment, the second signal S1 is a full swing signal. The JP section of the second signal S1 represents that jittering is caused to the first signal Si due to noise or other factor, and the level of the sampling data is an uncertain value if the sampling data is within the JP section. The SP section of the second signal S1 represents that the signal is not interfered by noise or other factor, and the level of the sampling data is consistent if the sampling data is within the SP section. The "minimum swing" denoted in FIG. 2A represents the minimum swing of the input signal (the first signal Si), and the equalizer 201 can convert a small swing signal at the input terminal into a full swing signal without producing large jittering which may cause bit error.

In the present embodiment, the sampling unit 203 is assumed to be sampling the second signal S1 with five times over-sampling. In FIG. 2A, D0, D1, . . . , D4 respectively represent the $1^{st}$ to the $5^{th}$ sampling data in the sampling data Ds of the sampling unit 203. As shown in FIG. 2A, D1, D2, and D3 fall within the eye diagram, while D0 and D4 do not, accordingly the levels of the sampling data D1~D3 must be the same, and the levels of the sampling data D0 and D4 are uncertain values. The sampling data Ds is input to the logic circuit 206 to produce a detecting signal Sd. If the first signal Si received by the equalizer 201 has good quality, namely, the swing of the first signal Si is large, then the eye diagram obtained is long, here the sampling data is not inclined to falling outside of the eye diagram, which means the eye diagram is good enough and no error bit will be produced. Contrarily, if the first signal Si received by the equalizer 201 is interfered by noise or other factor, the swing of the first signal Si is smaller, then the eye diagram obtained is shorter, here the sampling data may fall outside of the eye diagram easily, which means the eye diagram is not good enough and error bit may be produced.

Figure 3:
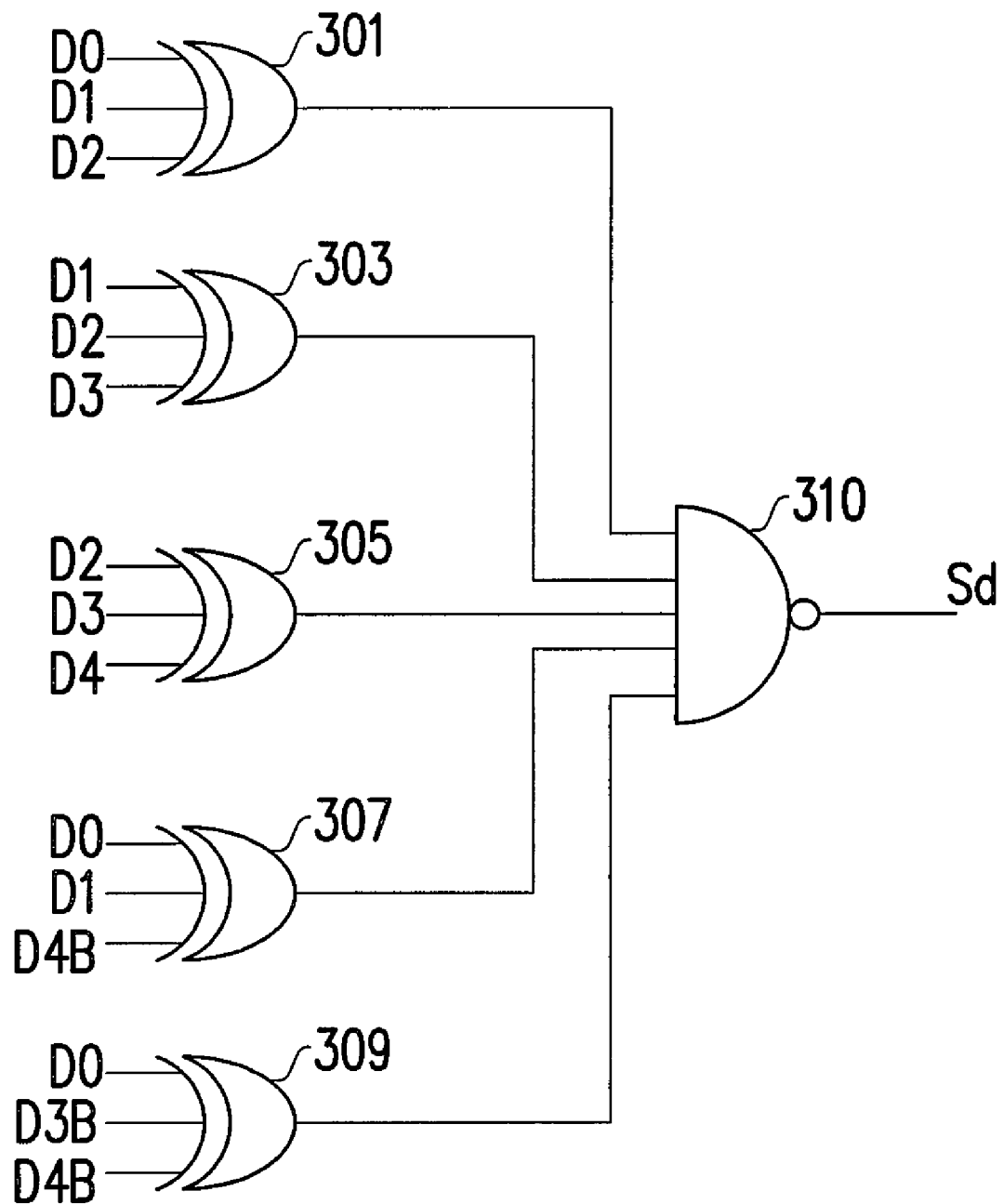
FIG. 3 is a circuit diagram of the logic circuit in an eye-opening monitor unit according to an exemplary embodiment of the present invention.

FIG. 3 is a circuit diagram of the logic circuit in an eye-opening monitor unit according to an exemplary embodiment of the present invention. Referring to both FIG. 2 and FIG. 3, wherein D0~D4 respectively represent the $1^{th}$ to the $5^{th}$ sampling data in the sampling data Ds, and the sampling data D3B and D4B respectively represent the reverse signals of sampling data D3 and D4. There are five XOR gates 301, 303, 305, 307 and 309, and a NAND gate 310. The outputs of the XOR gates are all connected to the input terminal of the NAND gate 310, and the NAND gate 310 outputs the detecting signal Sd. In the present embodiment, the logic circuit 206 in the eye-opening monitoring unit is composed of a plurality of XOR gates and a NAND gate, however, the present invention is not limited thereto.

Figure 4A:
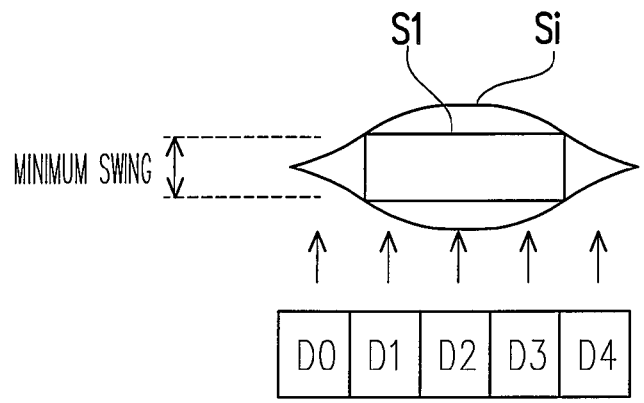
FIGS. 4A~4C are diagrams illustrating the eye diagram detecting result being normal according to an exemplary embodiment of the present invention.
Figure 4B:
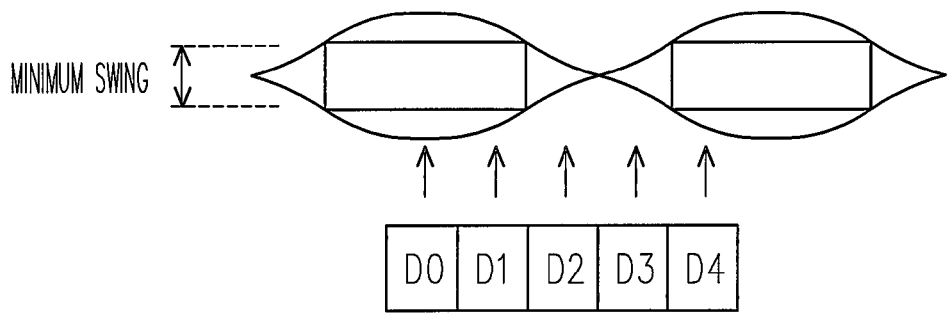
Figure 4C:
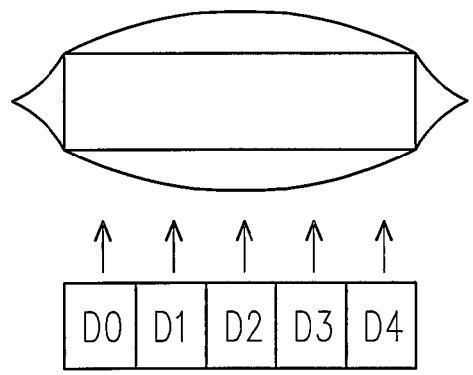

FIGS. 4A~4C are diagrams illustrating the eye diagram detecting result being normal according to an exemplary embodiment of the present invention. In the present embodiment, five times over-sampling is used as example for the convenience of description. However, the present invention is not limited thereto.

First, referring to both FIG. 2 and FIG. 4A, the sampling unit 203 samples the second signal S1 with five times sampling to obtain the sampling data D0, D1, D2, D3, and D4. It can be seen from the figures that since the sampling timings of the sampling data D1, D2, D3 fall within the eye diagram, the values of the sampling data D1~D3 must be the same. The values of the sampling data D0 and D4 whose sampling timings fall outside of the eye diagram are unknown values.

The sampling data D0~D4 are used as the inputs of the XOR gates 301~309 in FIG. 3, and the outputs of the XOR gates 301~309 are input to the NAND gate 310. Take FIG. 4A for example, the levels of D1, D2, and D3 are all the same, thus the output of the XOR gate 303 is 0. Since the output of the XOR gate 303 is 0, the output of the NAND gate 310 is 1. The detecting signal Sd obtained by inputting the calculation result of the XOR gates 301~309 to the NAND gate 310 to perform NAND calculation remains at high level, which means there are at least 3 consecutive sampling data in the 5 sampling data fall within the eye diagram, thus, the monitoring result of the eye diagram of the first signal Si is normal, and the current internal parameters of the algorithm unit 207 are kept unchanged.

FIG. 4B is a diagram illustrating the monitoring result of an eye diagram being normal according to another exemplary embodiment of the present invention. Referring to FIG. 4B, the sampling unit 203 samples the second signal S1 with 5× over-sampling to obtain the sampling data D0, D1, D2, D3, and D4. As shown in FIG. 4B, the sampling timings of the sampling data D0, D1, and D4 fall inside of the eye diagram, thus, the values of the sampling data D0, D1, and D4B mush be the same. The sampling data D2 and D3 whose sampling timings fall outside of the eye diagram are uncertain values. The levels of D0, D1, and D4B are all the same, thus, the output of the XOR gate 307 is 0. Since the output of the XOR gate 303 is 0, the output of the NAND gate 310 is 1. The detecting signal Sd obtained by inputting the foregoing outputs of the XOR gates 301~309 to the NAND gate 310 to perform NAND calculation remains at high level, which means there are at least 3 consecutive sampling data in the 5 sampling data fall within the eye diagram, thus, the monitoring result of the eye diagram of the first signal Si is normal and the internal parameters of the equalizer 201 can be kept unchanged by the algorithm unit 207. It can be understood from FIG. 4B that even though the sampling phase of the sampling unit 203 is not correct, namely, the positions of the over-sampling data are not at the center, the logic circuit 206 still can determine whether the eye diagram of the first signal Si is good enough according to the sampling data D0~D4.

FIG. 4C is a diagram illustrating the monitoring result of an eye diagram being normal according to yet another exemplary embodiment of the present invention. The sampling unit 203 samples the second signal S1 with five times sampling to obtain the sampling data D0~D4. As shown in FIG. 4C, the sampling timings of the sampling data D0~D4 all fall within the eye diagram, thus, the values of the sampling data D0~D4 must be the same. Since the levels of the sampling data D0~D4 are all the same, the outputs of the XOR gates 301, 303, and 305 are 0. The detecting signal Sd obtain by inputting the outputs of the XOR gates 301~309 to the NAND gate 310 to perform NAND calculation remains at high level, which means there are at least three consecutive sampling data of the five sampling data fall within the eye diagram, thus, the monitoring result of the eye diagram of the first signal Si is normal, and the internal parameters of the equalizer 201 are kept unchanged by the algorithm unit 207. It can be understood from FIG. 4C that the level of the first signal Si in FIG. 4C is different from that of the first signal Si in FIG. 4A, the eye diagram obtained is different too. However, even though the eye diagrams in FIG. 4A and FIG. 4C are different, the detecting signal Sd obtained after the calculation of the logic circuit 206 both remain at high level, thus, the correctness of the monitoring result of eye diagram is not affected. The monitoring result of eye diagram can be determined to the normal as long as the levels of more than half of consecutive sampling data are the same.

Moreover, to improve the accuracy in eye-opening monitoring and to prevent the affections of noise or other factor to the monitoring result, the monitoring duration can be extended. In other words, multiple samplings are performed at different time to improve the reliability of the monitoring result of eye diagram. The monitoring time can be adjusted according to the actual requirement.

Figure 5:
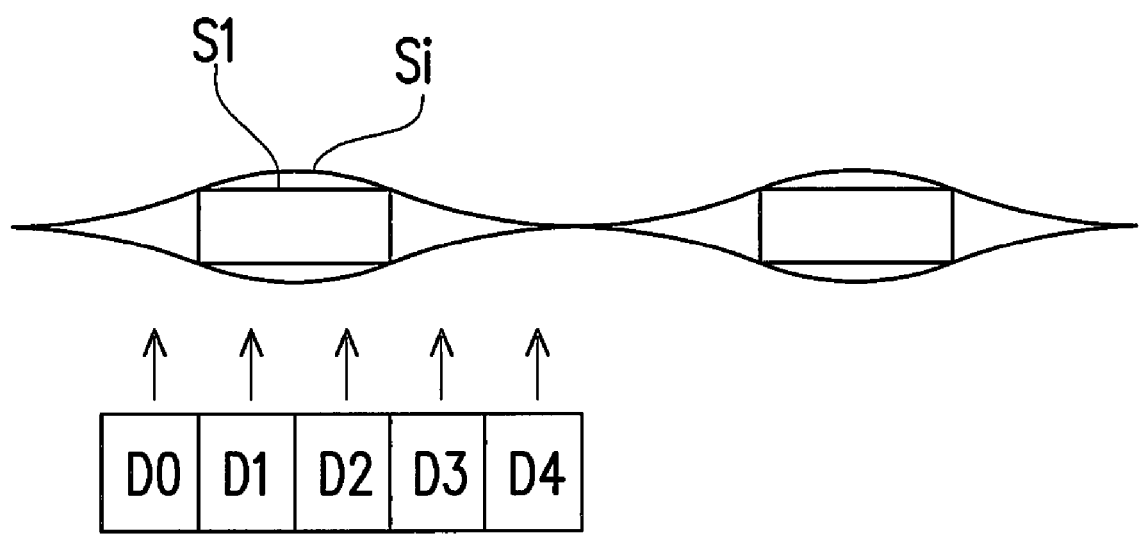
FIG. 5 is a diagram illustrating the eye diagram detecting result being abnormal according to an exemplary embodiment of the present invention.

FIG. 5 is a diagram illustrating the eye diagram detecting result being abnormal according to an exemplary embodiment of the present invention. The sampling unit 203 samples the second signal S1 with five times sampling to obtain the sampling data D0, D1, D2, D3, and D4. As shown in FIG. 5, only the sampling timings of sampling data D1 and D2 fall within the eye diagram, thus, the values of the sampling data D1 and D2 must be the same. The sampling data D0, D3, and D4 whose sampling timings fall outside of the eye diagram are unknown values. Since only the levels of the sampling data D1 and D2 are the same, the outputs of the XOR gates 301~309 are all 1 sometimes (i.e. the status of at least one of them being 0 cannot be maintained). As described above, the detecting signal Sd obtain after performing NAND calculation to the outputs of the XOR gates 301~309 by the NAND gate 310 cannot remain at high level (i.e. sometimes it is at low level), which means no at least three consecutive sampling data in the five sampling data fall within the eye diagram, thus the monitoring result of the eye diagram of the first signal Si is abnormal, and the algorithm unit 207 has to adjust the parameters of the equalizer 201. The adjusting manner of the algorithm unit 207 is, for example, building up a look up table containing a plurality of default parameters in the algorithm unit 207. The algorithm unit 207 further includes a timer for timing the duration of the detecting signal Sd remaining at high level. When the detecting signal Sd remains at high level within a particular period, which is, the monitoring result of the eye diagram is normal, the algorithm unit 207 keeps a group of default parameters selected from the look up table as the internal parameters to be output. When the detecting signal Sd is at low level sometimes, which is, the monitoring result of the eye diagram is abnormal, the algorithm unit 207 selects another group of default parameters for adjustment until the detecting signal Sd remains at high level eventually.

In overview, according to the present invention, whether the eye diagram of an input signal is normal is monitored by using over-sampling technology, and whether the parameters of the equalizer are to be adjusted are determined accordingly. In the conventionally technology, the input signal is compensated by a feedback circuit, and the method used includes detecting the height of the eye diagram with comparators and detecting the width of the eye diagram with a phase interpolator to actually detect the size of the eye diagram. In the present invention, the input signal is over-sampled by using digital eye-opening monitoring method so as to obtain a plurality of sampling data. The number of devices used can be reduced greatly, and the area of the chip can be reduced so as to reduce the manufacturing cost, furthermore, the power consumption can be reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An adaptive equalizer apparatus, suitable for converting a first signal into a third signal, the adaptive equalizer apparatus comprising:
    an equalizer unit, for receiving and equalizing the first signal, and outputting a second signal;
    a sampling unit, electrically connected to the equalizer unit, for receiving and over-sampling the second signal to obtain a plurality of sampling data, wherein the sampling unit further determines a logic status of the second signal according to the sampling data and outputs the third signal; and
    an eye-opening monitor unit, comprising a logic circuit for determining whether there are more than a particular number of consecutive sampling data having the same logic level in the sampling data and outputting the detecting signal accordingly, wherein the eye-opening monitor unit is electrically connected to the sampling unit and the equalizer unit, for processing the sampling data and outputting a detecting signal;
    wherein the detecting signal represents an adequacy of internal parameters of the equalizer unit, and the equalizer unit decides whether to change the internal parameters according to the detecting signal.

2. The adaptive equalizer apparatus as claimed in claim 1, wherein when there are more than a particular number of consecutive sampling data having same logic level in the sampling data, a level of the detecting signal is a first level, otherwise, the level of the detecting signal is a second level.

3. The adaptive equalizer apparatus as claimed in claim 1, wherein the equalizer unit comprises:
    an equalizer, for equalizing the first signal according to the internal parameters, and outputting the second signal; and
    a algorithm unit, electrically connected to the eye-opening monitor unit and the equalizer, for determining the internal parameters and outputting the internal parameters to the equalizer, wherein the algorithm unit further determines whether to adjust the internal parameters according to the detecting signal.

4. The adaptive equalizer apparatus as claimed in claim 3, wherein the algorithm unit comprises:
    a look up table, comprising a plurality of default parameters; and
    a timer, for timing a duration of the detecting signal remaining at the first level;
    wherein the algorithm unit selects a group of the default parameters from the look up table as the internal parameters, and the algorithm unit further determines whether to select other default parameters from the look up table as the internal parameters according to the detecting signal and the timer.

5. The adaptive equalizer apparatus as claimed in claim 3, wherein when the level of detecting signal remains at a first level within a particular period, the algorithm unit keeps the internal parameters; when the level of detecting signal is transformed into a second level, the algorithm unit adjusts the internal parameters.

6. The adaptive equalizer apparatus as claimed in claim 1, wherein the logic circuit comprises:
    a plurality of XOR gates, wherein each of the XOR gates respectively receives part of the sampling data; and
    a NAND gate, for receiving outputs of the XOR gates, and outputting the detecting signal.

7. The adaptive equalizer apparatus as claimed in claim 1, wherein the first signal is a differential signal.

8. The adaptive equalizer apparatus as claimed in claim 1, wherein the second signal is a full swing signal.

9. The adaptive equalizer apparatus as claimed in claim 1, wherein the third signal is a digital signal.

10. A digital eye-opening monitor unit, suitable for an adaptive equalizer apparatus, wherein the adaptive equalizer apparatus is used for equalizing a first signal to obtain a second signal, and converting the second signal into a third signal, and the logic status of the third signal is determined according to a plurality of sampling data obtained by over-sampling the second signal, the digital eye-opening monitor unit comprising:

a logic circuit, wherein the logic circuit determines whether there are more than a particular number of consecutive sampling data having the same logic level in the sampling data, and outputting a detecting signal accordingly;

wherein the adaptive equalizer apparatus determines whether to change internal parameters thereof according to the detecting signal.

11. The digital eye-opening monitor unit as claimed in claim 10, wherein when there are more than the particular number of consecutive sampling data having the same logic level in the sampling data, the detecting signal remains at a first level, otherwise, the level of detecting signal is a second level.

12. The digital eye-opening monitor unit as claimed in claim 10, wherein when the level of detecting signal remains at the first level, the adaptive equalizer apparatus keeps the internal parameters; when the level of the detecting signal is transformed into a second level, the adaptive equalizer apparatus adjusts the internal parameters.

13. The digital eye-opening monitor unit as claimed in claim 10, wherein the logic circuit comprises:

a plurality of XOR gates, each of the XOR gates respectively receiving part of the sampling data; and a NAND gate, for receiving outputs of the XOR gates, and outputting the detecting signal.

14. The digital eye-opening monitor unit as claimed in claim 10, wherein the first signal is a differential signal.

15. The digital eye-opening monitor unit as claimed in claim 10, wherein the third signal is a digital signal.

16. A digital eye-opening monitoring method, comprising the steps of:

a. over-sampling an input signal to obtain a plurality of sampling data;

b. determining whether there being more than a particular number of consecutive sampling data having the same logic level in the sampling data; and c. monitoring whether the eye diagram of the input signal being normal, wherein if the determination result remains at a first level within a particular period, the eye diagram of the input signal is normal; and if the determination result is transformed into a second level within a period, the eye diagram of the input signal is abnormal.

17. The monitoring method as claimed in claim 16, wherein the step b further comprises:

respectively performing XOR calculations to part of the sampling data to obtain a plurality of XOR calculation results; and performing NAND calculation with the XOR calculation results to obtain the determination result.

* * * * *